US012060072B2

(12) United States Patent
Park et al.

(10) Patent No.: US 12,060,072 B2
(45) Date of Patent: Aug. 13, 2024

(54) APPARATUS AND METHOD FOR PROVIDING DRIVE GUIDE INFORMATION OF CONSTRUCTION EQUIPMENT

(71) Applicant: HD HYUNDAI INFRACORE CO., LTD., Incheon (KR)

(72) Inventors: Kwangseok Park, Incheon (KR); Jinhyuk Oh, Incheon (KR); Sookyung Heo, Siheung-si (KR)

(73) Assignee: HD HYUNDAI INFRACORE CO., LTD., Incheon (KR)

( * ) Notice: Subject to any disclaimer, the term of this patent is extended or adjusted under 35 U.S.C. 154(b) by 606 days.

(21) Appl. No.: 17/324,292

(22) Filed: May 19, 2021

(65) Prior Publication Data

US 2021/0362737 A1 Nov. 25, 2021

(30) Foreign Application Priority Data

May 19, 2020 (KR) ........................ 10-2020-0059911

(51) Int. Cl.
*B60W 50/14* (2020.01)
*B60K 35/00* (2024.01)
(Continued)

(52) U.S. Cl.
CPC ............. *B60W 50/14* (2013.01); *B60K 35/00* (2013.01); *B60W 50/10* (2013.01);
(Continued)

(58) Field of Classification Search
None
See application file for complete search history.

(56) References Cited

U.S. PATENT DOCUMENTS

2005/0283295 A1 12/2005 Normann
2013/0167227 A1 6/2013 Miura et al.
(Continued)

FOREIGN PATENT DOCUMENTS

| JP | 2005163470 A | * | 6/2005 |
| JP | 2020-20145 A | | 2/2020 |
| WO | 2008/074008 A2 | | 6/2008 |

OTHER PUBLICATIONS

Espacenet English Translation of JP2005163470A Description (Year: 2005).*

(Continued)

*Primary Examiner* — Michael D Lang
*Assistant Examiner* — Andrew Sang Kim
(74) *Attorney, Agent, or Firm* — Hauptman Ham, LLP

(57) ABSTRACT

An exemplary embodiment of the present disclosure relates to an apparatus providing drive guide information of a construction equipment includes: an information acquisition unit acquiring information generated according to a motion of the construction equipment; a storage unit storing an item defined for calculating a score for worker driving of the construction equipment and an equation for calculating the score for the item, and storing a guide phrase for each item and information on equipment setting change for each item; a control unit calculating the score for each item according to the information provided, and selecting an item which needs to be improved based on the calculated score for each item; and a display unit displaying a guide phrase matching an item selected according to an instruction of the control unit and information on equipment setting change matching the selected item at a predetermined time.

14 Claims, 9 Drawing Sheets

(51) Int. Cl.
*B60K 35/28* (2024.01)
*B60W 50/10* (2012.01)
*G07C 5/08* (2006.01)

(52) U.S. Cl.
CPC ............ *G07C 5/0825* (2013.01); *B60K 35/28* (2024.01); *B60K 2360/167* (2024.01); *B60W 2540/215* (2020.02)

(56) References Cited

U.S. PATENT DOCUMENTS

2015/0199360 A1* 7/2015 Pfeiffer .................. G06Q 50/02
  707/723
2018/0341901 A1* 11/2018 Shike .................... G06Q 50/08
2020/0048866 A1  2/2020 Weber et al.

OTHER PUBLICATIONS

Extended European Search Report dated Oct. 22, 2021, in connection with the counterpart European Patent Application No. EP21174742.3.

* cited by examiner

FIG. 3

| Item | Determination condition | Calculation equation |
|---|---|---|
| LIS function use recommendation | Time for which LIS setting vehicle speed or more is maintained while the LIS function is turned off | = 100 - [{Σ LIS set vehicle speed or more & LIS off maintenance time (minute)}] / total actuation time (minute) × 100 |
| LIS vehicle speed setting up change recommendation | 1. LIS ON selection state<br>2. Whether to manipulate front<br>3. Compare LIS setting speed and vehicle speed<br>4. When front manipulation is frequent at LIS setting speed or more, setting speed up | = 100 - [{Σ LIS set vehicle speed or more & main pressure 100 bar or more maintenance time (minute)}] / vehicle speed ≠ 0 kph total actuation time (minute) × 100 |
| LIS vehicle speed setting down change recommendation | 1. LIS ON selection state<br>2. Whether to manipulate front<br>3. Compare LIS setting speed and vehicle speed<br>4. When ratio of vehicle speed is XX% or less, LIS setting speed down | = 100 - [{Σ LIS set vehicle speed or less (except for 0 kph) & main pressure 100 bar or less}] / vehicle speed ≠ total actuation time (minute) of 0 kph state × 100 |
| 1-4 auto use recommendation | 1. Determine when T/M mode (manual or 2-4A) & selection gear 2-stage or more are selected<br>2. When T/M stall state occurs<br>3. Convert number of times of occurrence per unit time (1 hour) for total actuation time | = 100 - (nue value * a or less & the number of times at which engine rpm of b or more is maintained for c seconds or more × 1)<br>* nue value: T/M input speed / engine rpm speed |
| Manual gear maximum speed driving | 1. Maintain maximum speed of current selected stage number for d seconds or more<br>2. Convert number of times of occurrence per unit time (1 hour) for total actuation time | = 100 - (the number of times at which selected gear maximum speed is maintained for d seconds or more × 2)<br>(however, excluded in case of selecting a 4-stage) |

FIG. 4

| Item | Determination condition | Calculation equation |
|---|---|---|
| Idle state prevention | Auto idle entrance possible condition maintenance time maintained while the LIS function is turned off | = 100 - [Σ{(auto idle entrance possible maintenance time of e minutes) ^ 2}] / total actuation time (minute) x 100 |
| Rpm rise in gear neutral state | 1. Fuel consumption stop due to unnecessary engine rpm rise<br>2. Convert number of times of occurrence per unit time (1 hour) for total actuation time | = 100 - (rise in accelerator pedal instruction by f% or more in selection gear neutral and front non-manipulation state (forced regeneration, Cal. Reverse rotation condition excluded) (1 second or more x 1) |
| Lock-up use recommendation | Maintain lock-up motion reference speed for 3 seconds or more in lock-up function off state | = 100 - [Σ{(vehicle speed of g kph or more & lock-up function selection off maintenance time (minute)}] / total actuation time (minute) x 100 |
| Engine mode down recommendation | 1. Activated only when selecting engine modes S and P<br>2. Determine down possibility of mode through foot switch use frequency<br>3. Convert number of times of occurrence per unit time (1 hour) for total actuation time | Number of times of a power mode foot switch motion per unit time x 3 |

FIG. 5

| Item | Determination condition | Calculation equation |
|---|---|---|
| Sudden stop prevention | 1. Count when vehicle speed is abruptly stopped<br>2. Convert number of times of occurrence per unit time (1 hour) for total actuation time | = 100 - (the number of times of maintaining vehicle speed of h kph or more & brake pedal pressure of xx bar or more (or brake pedal displacement of l% or more) for j seconds or more x 2) |
| Prevention of braking without braking intention | 1. Continuously maintain pedal pressure of 3 to 10 bar<br>2. Convert number of times of occurrence per unit time (1 hour) for total actuation time | = 100 - (the number of times of continuously maintaining the brake pedal pressure interval of 3 to 10 bar & accelerator pedal input state for k seconds or more x 3) |
| Unnecessary hydraulic relief | 1. Hydraulic stall occurs for 1 second or more<br>2. Convert number of times of occurrence per unit time (1 hour) for total actuation time | = 100 - (the number of times of reaching a front relief pressure value without a change in angle sensor value (for 1 second or more) x 5) |
| ICCO function use recommendation | 1. Use brake pedal pressure in ICCO function off state and accelerator pedal in displacement sensor input state<br>2. Convert number of times of occurrence per unit time for total actuation time<br>3. Occurrence determination reference: forward movement state & brake pressure of l bar or more & accelerator pedal valid switch 'ON' & rpm of m or more | = 100 - (forward movement state & brake pressure of l bar or more & accelerator pedal valid switch 'ON' & rpm m or more (for 1 second or more) x 1) |

FIG. 7

| Category | Function item | Active control |
|---|---|---|
| Driving efficiency improvement | LIS function use recommendation | Recommend LIS use |
| | LIS vehicle speed setting up change recommendation | Recommend LIS setting vehicle speed up |
| | LIS vehicle speed setting down change recommendation | Recommend LIS setting vehicle speed down |
| | 1-4 auto use recommendation | Recommend automatic 1-4 mission mode use |
| | Manual gear maximum speed driving | Recommend selection gear up |
| Fuel efficiency performance improvement | Idle state prevention | Recommend turning off start during idling |
| | Rpm rise in gear neutral state | Recommend decreasing accelerator pedal use in stop state |
| | Lock-up use recommendation | Recommend lock-up use |
| | Engine mode down recommendation | Recommend engine mode down |
| Equipment durability enhancement | Sudden stop prevention | Recommend decreasing sudden braking |
| | Prevention of braking without braking intention | Recommend decreasing excessive brake pedal use |
| | Unnecessary hydraulic stall | Recommend decreasing excessive work machine use |
| | ICCO function use recommendation | Recommend ICCO use |

FIG. 8

| Category | Function item | Active control |
|---|---|---|
| Driving efficiency improvement | LIS function use recommendation | LIS function 'ON' |
| | LIS vehicle speed setting up change recommendation | None |
| | LIS vehicle speed setting down change recommendation | None |
| | 1-4 auto use recommendation | Change to T/M A1-4 mode |
| | Manual gear maximum speed driving | None |
| Fuel efficiency performance improvement | Idle state prevention | Auto idle 'ON' & ASD 'ON' |
| | Rpm rise in gear neutral state | None |
| | Lock-up use recommendation | Lock-up 'ON' |
| | Engine mode down recommendation | Engine mode P → S (in case of current P) or S → E (in case of current S) |
| Equipment durability enhancement | Sudden stop prevention | None |
| | Prevention of braking without braking intention | None |
| | Unnecessary hydraulic stall | None |
| | ICCO function use recommendation | ICCON 'ON' |

APPARATUS AND METHOD FOR PROVIDING DRIVE GUIDE INFORMATION OF CONSTRUCTION EQUIPMENT

CROSS-REFERENCE TO RELATED APPLICATIONS

This application claims benefit and priority to Korean Patent Application No. 10-2020-0059911, filed on May 19, 2020, with the Korean Intellectual Property Office, the disclosure of which is incorporated herein in its entirety by reference.

TECHNICAL FIELD

The present disclosure relates to an apparatus and a method for providing drive guide information of a construction equipment, and more particularly, to an apparatus and a method for providing drive guide information of a construction equipment, which may allow a worker to recognize fuel efficiency for a current work by comparing and displaying optimal standard fuel efficiency and actual current fuel efficiency according to a current work of a construction machine on an instrument panel while working and driving of the construction machine.

BACKGROUND

In general, examples of heavy equipment include an excavator, a forklift, a loader, etc. The excavator performs various works including excavation, ground leveling, ground tamping, elevation of heavy objects, etc. The forklift which is used for lifting and loading a relatively high-weighted cargo or lifting and transporting the high-weighted cargo to a location desired by an operator is widely used through the industries. The loader is widely used for performing an excavation work of excavating the soil, sand, etc., a transportation work of transporting the excavated soil, a loading work of loading or unloading the transported soil to or from a cargo vehicle, a road grading work, a snow removing work, a towing work, etc., in a construction site.

In the heavy equipment such as the excavator, the forklift, the loader, etc., a work machine is actuated by using a manipulation lever, a manipulation pedal, a joystick, etc., in a cabin or an operating room. When the manipulation lever, the manipulation pedal, the joystick, etc., are manipulated while the heavy equipment is started, the work machine is actuated by controlling each hydraulic cylinder or hydraulic actuator.

In operating and manipulating the heavy equipment, there is a representative work such as the excavation, the ground leveling, etc., in the excavator as mentioned above, there is a representative work such as the work of lifting and unloading the high-weight cargo, the work of transporting the high-weight cargo, etc., in the forklift, and there is a representative work such as the excavation work, the transportation work of transporting the excavated soil, etc., in the loader.

In the works, there are many differences in terms of fuel efficiency by a work pattern such as a manipulation habit of the worker in the construction machine. In particular, since the construction machine performs the work for a long time and a fuel consumption amount of an engine is large, there is a large difference in fuel consumption amount for each worker even though the same work is performed by using the construction machine.

As such, since there is a large difference in fuel consumption amount according to the manipulation habit in the construction machine, the operator needs to operate the construction machine in an efficient manipulation pattern.

However, even though unskilled persons or beginners perform the work in the same work environment by using the same equipment, since a work manipulation pattern, e.g., a stepping amount of the manipulation pedal or a manipulation direction or a manipulation amount of the manipulation lever varies and controlling a manipulation time of the manipulation pedal and/or the manipulation lever is poor, the work machine is excessively raised or unnecessary actuation is applied according to a case where manipulation of the work machine is inefficiently performed, and as a result, fuel efficiency is wasted, a work man-hour increases, and an emission amount of exhaust gas increases.

There is a problem in that since an efficient work guide system for the unskilled persons or beginners is not provided in the conventional heavy equipment, the unskilled persons or beginners cannot but learn an efficient work manipulation pattern through repeated experiences while investing a lot of time and efforts in an actual work site for a long time.

To this end, in order to promote improvement of the fuel efficiency in the prior art, provided is a construction equipment which has a technique of displaying standard fuel efficiency and the fuel efficiency of the worker or a function to improve the fuel efficiency or a function to execute a display for promoting the fuel efficiency improvement.

However, there is a concern that the worker of the construction equipment will not afford to execute coping, ignore the display, or will be incapable of taking an appropriate reaction due to ignorance of a new function even when there is a display of promoting the improvement fuel efficiency consumption while performing the construction operation.

SUMMARY

The present disclosure has been made in an effort to provide an apparatus and a method which may allow an operator to easily improve a habit of driving of the operator.

The present disclosure has also been made in an effort to provide an apparatus and a method for objectively evaluating an overall driving habit of a construction equipment.

The present disclosure has also been made in an effort to provide an evaluation result for a comprehensive driving score of the operator with high visibility.

An exemplary embodiment of the present disclosure provides an apparatus for providing drive guide information of a construction equipment which includes: an information acquisition unit acquiring information generated according to a motion of the construction equipment; a storage unit storing an item defined for calculating a score for worker driving of the construction equipment and an equation for calculating the score for the item, and storing a guide phrase for each item and information on equipment setting change for each item; a control unit calculating the score for each item according to the information provided from the information acquisition unit and the equation, and selecting an item which needs to be improved based on the calculated score for each item; and a display unit displaying a guide phrase matching an item selected according to an instruction of the control unit and information on equipment setting change matching the selected item at a predetermined time, in which the control unit is capable of changing equipment setting of the selected item.

The apparatus further includes an input unit receiving a user approval for the equipment setting change, in which the control unit changes the equipment setting of the selected item when the user approval is input through the input unit.

The predetermined time includes at least any one time of a start-on time or a start-off time.

The defined item includes a large category item and a small category item, and the storage unit further includes a determination condition of each small category item and a calculation equation for each of the small category items.

The large category item is classified into and includes driving efficiency of the construction equipment, fuel efficiency performance, and equipment durability.

Each calculation equation is based on the number of occurrence times and a maintenance time for the small category item for a unit time while driving the construction equipment.

The control unit preferentially selects an item having a lower score among items having a score equal to or less than a predetermined reference score with respect to the small category item.

The control unit calculates a score based on data acquired from the start-on time to the start-off time of the construction equipment.

The control unit averages the score calculated for each small category item included in the large category item and sets the averaged score as an evaluation score of the large category item, and a weight is applied to the evaluation score of each large category item, which is averaged to calculate the comprehensive score.

The defined item includes driving efficiency of the construction equipment, fuel efficiency performance, and equipment durability, and the control unit calculates a comprehensive score by applying a weight to an evaluation score of each large category item, and a higher weight is assigned in the order of the driving efficiency, the fuel efficiency performance, and the equipment durability.

When there is a plurality of items in which the equipment setting change is displayed, the control unit enables an approval of a worker to be inputted for each item.

Another exemplary embodiment of the present disclosure provides an information providing method of an apparatus for providing drive guide information of a construction equipment, which includes: acquiring information generated according to a motion of the construction equipment; calculating a score for each item based on a predefined item, an equation for calculating a score for the item, and the acquired information; selecting an item which needs to be improved based on the score for each item; displaying a guide phrase matching the selected item and information on equipment setting change matching the selected item at a predetermined time; and changing equipment setting of the selected item.

The method further includes, between the displaying of the information on the equipment setting change at the predetermined time and the changing of the equipment setting of the selected item, providing an interface for receiving a user approval for the equipment setting change.

The interface enables an approval of a worker to be inputted for each item in which the equipment setting change is displayed.

The predetermined time includes at least any one time of a start-on time or a start-off time.

The defined item includes a large category item and a small category item, and a determination condition of each small category item and a calculation equation for each small category item are prestored.

The defined item includes driving efficiency of the construction equipment, fuel efficiency performance, and equipment durability, and the control unit calculates a comprehensive score by applying a weight to an evaluation score of each large category item, and a higher weight is assigned in the order of the driving efficiency, the fuel efficiency performance, and the equipment durability.

According to an exemplary embodiment of the present disclosure, the driving habit of the construction equipment can be objectively and comprehensively evaluated.

According to an exemplary embodiment of the present disclosure, operator customized information for driving improvement is provided based on information on previous driving during key-on, thereby effectively improving the driving habit.

According to an exemplary embodiment of the present disclosure, there is an effect of improving consciousness and enhancing execution power by executing comprehensive-viewpoint monitoring for driving of the operator.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Various aspects are now described with reference to the drawings and like reference numerals are generally used to designate like elements. In the following exemplary embodiments, for the purpose of description, multiple specific detailed matters are presented to provide general understanding of one or more aspects. However, it will be apparent that the aspect(s) can be executed without the specific detailed matters. In other examples, known structures and apparatuses are illustrated in a block diagram form in order to facilitate description of the one or more aspects.

FIG. 3 is a diagram illustrating a score calculation table for driving efficiency according to an exemplary embodiment of the present disclosure.

FIG. 4 is a diagram illustrating a score calculation table for fuel efficiency performance according to an exemplary embodiment of the present disclosure.

FIG. 5 is a diagram illustrating a score calculation table for equipment durability according to an exemplary embodiment of the present disclosure.

FIG. 7 is a diagram displaying a guide phrase corresponding to a small category item according to an exemplary embodiment of the present disclosure.

FIG. 8 is a diagram for describing a active control specification corresponding to the small category item according to an exemplary embodiment of the present disclosure.

DETAILED DESCRIPTION

Figure 1:
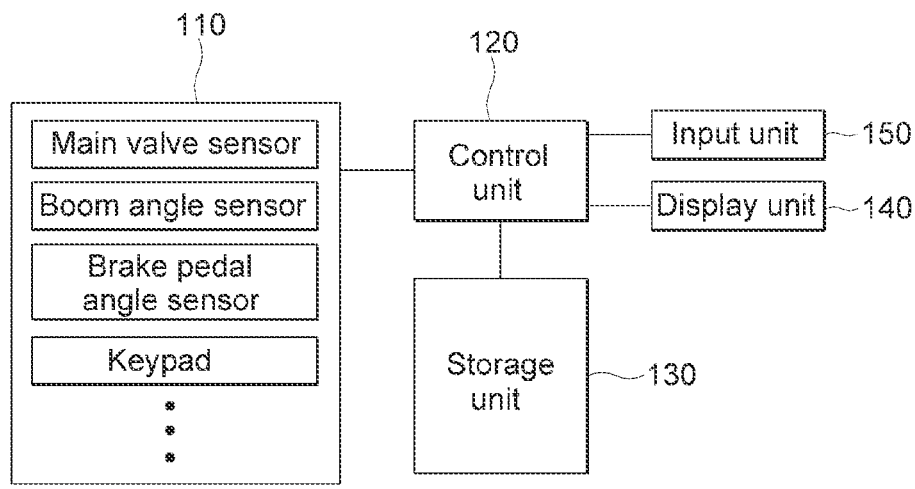
FIG. 1 is a block diagram for describing an example of a server according to some exemplary embodiments of the present disclosure.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, exemplary embodiments of the present disclosure will be described in detail with reference to the accompanying drawings.

In describing the exemplary embodiments, description of technical contents which are well known to the technical field to which the present disclosure pertains and not directly related to the present disclosure will be omitted. This is to omit an unnecessary description, so that the gist of the present disclosure is not blurred and more clearly conveyed.

For the same reason, some components in the accompanying drawings were exaggerated or omitted or illustrated schematically. Further, the size of each component does not entirely reflect the actual size. In each drawing, the same or corresponding component is represented by the same reference numeral.

Hereinafter, the present disclosure will be described with reference to drawings for describing an apparatus for providing drive guide information of a construction equipment according to exemplary embodiments of the present disclosure.

FIG. 1 is a configuration diagram schematically illustrating a configuration of an apparatus for providing drive guide information of a construction equipment according to an exemplary embodiment of the present disclosure.

An apparatus 100 for providing drive guide information of a construction equipment according to an exemplary embodiment of the present disclosure which is applied to a construction machine that actuates a work machine by a working fluid discharged from a hydraulic pump directly connected to an engine may include an information acquisition unit 110, a control unit 120, a storage unit 130, a display unit 140, and an input unit 150.

The information acquisition unit 110, the control unit 120, the storage unit 130, and the display unit 140 may send and receive information to and from each other through CAN communication.

The information acquisition unit 110 as an acquisition unit of information generated by driving of the construction equipment may include, for example, an ECU, a TCU, and various sensors. Various sensors may include a main valve sensor, a boom angle sensor, a brake pedal angle sensor, and the like, and are connected to an accelerator pedal and a key pad to acquire an input signal generated according to manipulation thereof.

The information acquisition unit 110 may include a joystick generating a manipulation signal for driving the work machine, an engine driven to output a working fluid corresponding to the manipulation signal from a hydraulic pump, a swash plate angle valve controlling a flow rate of the working fluid output from the hydraulic pump, an engine control unit controlling the driving of the engine, a main control valve outputting the working fluid of the hydraulic pump to the work machine, a pressure sensor sensing a load pressure generated by the work machine, etc.

The control unit 120 controls an overall operation of the apparatus for providing drive guide information of a construction equipment. In particular, the control unit 120 calculates a comprehensive score for construction equipment driving by using the information acquired through the information acquisition unit 110 and an item-specific score calculation table stored in the storage unit 130, and generates comprehensive evaluation information based on the calculated score.

In order to generate the comprehensive evaluation information, the control unit 120 calculates each item-specific score by using information acquired through the information acquisition unit 110 from a start-on time to a start-off time, and the item-specific score calculation table stored in the storage unit 130, and applies a weight granted to each item to the item-specific score to calculate a comprehensive score.

The control unit 120 selects a guide phrase based on a small category item-specific score and the comprehensive score, and provides guide information to the display unit 140.

A small category item-specific guide phrase is prestored in the storage unit 130 to be described below.

The control unit displays a comprehensive score for previous driving and a guide phrase for items preferentially displayed during key-on.

The control unit 120 guides an active control function corresponding to a driving guide based on the small category item-specific score and the comprehensive score.

Further, the control unit 120 provides an interface for receiving a user approval for changing equipment setting, and when a user accepts an active control, executes the active control through the provided interface to control a motion of the construction equipment.

The control unit 120 transmits a signal for instructing an appropriate operation to a component of the construction equipment for the active control to control the motion of the construction equipment.

The storage unit 130 stores the information acquired through the information acquisition unit 110, and stores a processor for calculating the comprehensive score for the driving habit by executing a program and a protocol required for evaluating the driving habit of the construction equipment, and various programs, etc. For example, the storage unit 130 stores the item-specific score calculation table, and stores data according to a control of the control unit 120 and transfers requested data to the control unit 120.

The display unit 140 outputs a screen according to the control of the control unit 120. The display unit 140 displays, for example, an interface for providing information and displays various data to allow the user to check a current state of the construction equipment. In particular, the display unit 140 displays the comprehensive score and the driving guide information of the construction equipment received from the control unit 120 to enable the user to check a current state of the construction equipment and take an action required therefor. In some exemplary embodiments, a component using other schemes capable of transferring information to other users, such as a voice output or vibration instead of a screen output may replace some functions of the display unit 140.

The input unit 150 converts an input motion of the user into an input signal, and transmits the input signal to the control unit 120. The input unit 150 may be implemented as, for example, a random button on an instrument panel, a touch sensor on a touch screen (display unit), a touch pad, a keypad, a voice input, and other input processing devices which are available at present or in the past or will be available in the future. For example, the input unit 150 may receive an information providing request input of the user and transfer the received information providing request input to the control unit 120.

In another modified example, when an apparatus 200 for providing drive guide information of a construction equipment further includes a communication unit, the apparatus 200 may transmit an evaluation result to an external terminal or a server through the communication unit. The external terminal may be a terminal of the user which includes at least one of an owner, a worker, and a manager of the construction equipment.

When the server receives information from the information providing apparatus 200, the server may compare and analyze received data and store the data for each worker or for each construction equipment. Further, the server may analyze data for each mode and for each region based on the received data.

A specific motion of each component of the drive guide information providing apparatus 200 of the construction equipment will be described below in detail with reference to FIGS. 2 to 7.

Figure 2:
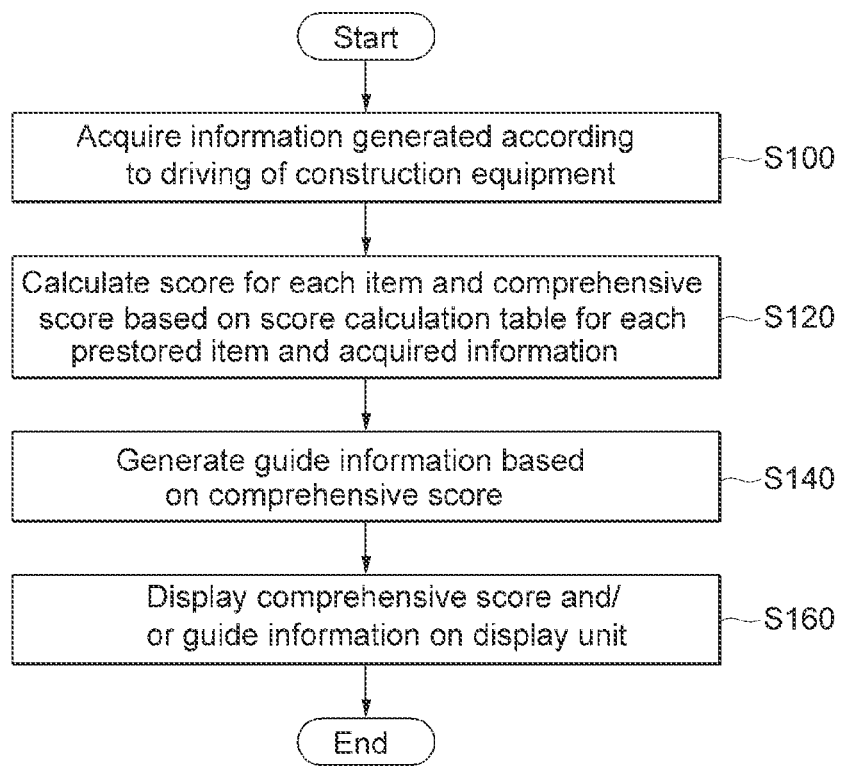
FIG. 2 is a flowchart for describing drive guide information providing of the construction equipment according to an exemplary embodiment of the present disclosure.

FIG. 2 is a flowchart for describing drive guide information providing of the construction equipment according to an exemplary embodiment of the present disclosure.

Referring to FIG. 2, the information acquisition unit 110 acquires information generated according to driving of the construction equipment and transfers the acquired information to the control unit 120 or the storage unit 130 (S100).

The control unit 120 calculates a comprehensive score based on the information generated according to the driving, which is stored in the storage unit 130 and a prestored item-specific score calculation table (S120).

In the item-specific score calculation table, a small category item for objectively evaluating driving of the worker for each item and an equation for evaluating the small category item are defined.

Large category items for evaluating the comprehensive score for the driving are driving efficiency, fuel efficiency performance, and equipment durability, and a small category item (hereinafter, referred to as a detailed item) for evaluating each large category item is predefined in the item-specific score calculation table. A calculation equation for objective evaluation for each detailed item is defined in the item-specific score calculation table.

The detailed item and the calculation equation for the large category item will be described below with reference to FIGS. 3 to 6.

When the score for the large category item is calculated, the comprehensive score is calculated by applying a preset weight to the score of each large category item.

A larger weight may be assigned in the order of a driving efficiency item, a fuel efficiency performance item, and an equipment durability item. For example, a weight of 1 may be granted to the driving efficiency item, a weight of 1.5 may be granted to the fuel efficiency performance item, and a weight of 2 may be granted to the equipment durability item.

Scores of the items to which respective weights are applied are added to calculate the comprehensive score. The comprehensive score may be converted into 100 points.

The control unit displays the comprehensive score and/or the drive guide information on the display unit (S140).

The score calculated through the large category item-specific score calculation table may be used as an objective index for the worker's driving.

The guide information includes a guide phrase corresponding to an item which has a reference score or less among the small category items included in each large category item. When there is a plurality of items having the reference score or less among the small category items, a detailed item having a lowest score is preferentially displayed and only detailed items equal to or less than N which is maximally set are displayed. N may be 2 or less, but is not limited thereto.

Limiting the number of items in which the guide phrase is displayed is an action for excluding a possibility that too many items are displayed, and as a result, the worker will not still be careful.

FIG. 3 is a diagram illustrating a score calculation table for driving efficiency according to an exemplary embodiment of the present disclosure. Referring to FIG. 3, in the score calculation table for the driving efficiency, a small category item for evaluating the driving efficiency is defined, and a factor calculation equation (equation) and a weight of each small category item are defined.

The driving efficiency item is a factor for checking whether a driver fails to be familiar with a convenience function of the equipment or whether the driver normally utilizes the convenience function.

The small category items for the driving efficiency are classified into load isolation system (LIS) function use recommendation, LIS vehicle speed setting change recommendation, 1-4 auto use recommendation, and manual gear maximum speed driving.

In the score calculation table for the driving efficiency, a determination condition for each small category item and a calculation equation based on the determination condition are defined.

The weight for the small category item of the driving efficiency is applied to the calculation equation of each small category item.

Prior to describing the load isolation system (LIS) function use recommendation item, an LIS function is a function for reducing a fatigue and a driving impact of the driver by increasing driving stability.

The LIS function use recommendation item is to check whether the LSI function is used in spite of an environment suitable for the use of the LIS function. The LIS function is a factor for increasing workability by determining whether the use of the LIS function is appropriate by monitoring a ratio of a driving situation during a total actuation time of the equipment and guiding the worker to use the LIS function.

The determination condition for the LIS function use recommendation item considers a time for which an LIS setting vehicle speed or more is maintained while the LIS function is turned off and such a calculation equation is defined as 100−[ΣLIS set vehicle speed or more & LIS off maintenance time (minute)}]/total actuation time (minute)× 100.

The LIS vehicle speed setting change recommendation is to prevent controllability from being degraded during excavation and loading due to boom cylinder variations accompanied while the LIS function is activated and operate only under a driving condition, but is a factor for guiding optimal speed value setting by monitoring a case where appropriate speed value setting is not made due to various working environmental conditions or function non-awareness of the user.

The LIS vehicle speed setting change recommendation includes LIS vehicle speed setting up change recommendation and LIS vehicle speed setting down change recommendation.

The determination condition for the item for the LIS vehicle speed setting upward change recommendation includes an LIS ON selection state, a front manipulation state of a front, an LIS setting speed, and a vehicle speed. More specifically, in the LIS ON selection state, if front manipulation is frequent at an LIS setting sped or more, the setting speed is recommended to be up.

A calculation equation therefor is defined as 100−[ΣLIS set vehicle speed or more & main pressure 100 bar or more maintenance time (minute)}]/vehicle speed≠0 kph total actuation time (minute)×100.

Here, a main pressure may be acquired by a pressure sensor, and the pressure sensor for detecting the main pressure may be mounted on a discharge line of a mina pump.

The determination condition for the item for the LIS vehicle speed setting down change recommendation includes the LIS ON selection state, whether to manipulate the front, the LIS setting speed, and the vehicle speed. In the LIS ON selection state, when the ratio of the vehicle speed is XX % or less, the LIS setting speed is recommended to be down.

A calculation equation therefor is defined as 100−[ΣLIS set vehicle speed or less (except for 0 kph) & main pressure 100 bar or less maintenance time (minute)}]/vehicle speed total actuation time (minute) of 0 kph state×100.

In the case of an automatic 1-4 mode among mission motion modes, a two-stage start is basic and the automatic 1-4 mode refers to a function to automatically change a stage to a 1 stage only when a situation requiring high driving force such as excavation or climbing occurs.

Some workers use automatic 2-4 mode by misunderstanding that driving performance at automatic 1-4 deteriorates due to the 1-stage start or frequent 1-stage shifting, and all the more, during the excavation or climbing, a situation occurs in which a timing of manually lowering to the 1-stage is delayed, and as a result, an adverse effect is given to workability and fuel efficiency. The 1-4 auto use recommendation is a factor for guiding a mission mode to be changed to automatic 1-4 when a situation in which the 1-stage shifting is required in the equipment is frequent by monitoring such a situation.

The determination condition for the item for the auto use recommendation considers determination when selecting a T/M mode (manual or 2-4A) & selection gear 2-stage or more and the number of times of occurrence of a T/M stall state for a unit time. In an exemplary embodiment of the present disclosure, the unit time is 1 hour. For example, when the T/M stall state occurs five times for a total actuation time of 3 hours, 5/3=1.7 (times) is reflected as the number of occurrence times for 1 hour.

A calculation equation therefor is 100−(nue value*a or less & the number of times at which engine rpm b or more is maintained for c seconds or more×$N_{a1}$), and here, a value of nue is defined as T/M (Transmission) input speed/engine rpm.

Here, a may be 0.1 to 0.5, b may be 1000 to 2000, c may be 1 to 5 seconds, and $N_{a1}$ as the weight for the small category item of the driving efficiency may be 1.

In manual gear maximum speed driving, maximum gear setting is a function for preventing the operator from driving the equipment at a speed of an unnecessary level or more at a workplace environment. However, the manual gear maximum speed driving is a factor for guiding to increase the working performance by increasing a gear limit or decreasing the use of the accelerator pedal by monitoring whether an excessive driving performance limit or an unintentional gear limit exerts a bad effect on the workability and the fuel efficiency.

The determination condition for the item for the manual gear maximum speed driving includes the number of times at which a current selected stage number is maintained to the maximum speed for 3 seconds or more for a unit time.

A calculation equation therefor is 100−(the number of times at which selected gear maximum speed is maintained for d seconds or more×$N_{a2}$)(however, except for a case of selecting a 4-stage). Here, d is 1 to 5.

Here, $N_{a2}$ as the weight for the small category item of the driving efficiency may be 2.

A highest weight may be assigned to the items for the manual gear maximum speed driving among the driving efficiency items.

In FIG. 3, it may be understood that a weight of an item for which the weight is not particularly indicated is set to 1.

FIG. 4 is a diagram illustrating a score calculation table for fuel efficiency performance according to an exemplary embodiment of the present disclosure. Referring to FIG. 4, in the score calculation table for the fuel efficiency performance, a small category item for evaluating the fuel efficiency performance is defined, and a factor calculation equation (equation) and a weight of each small category item are defined.

The fuel efficiency performance item is a factor for guiding the driver to increase the fuel efficiency by monitoring an unnecessary fuel efficiency loss situation due to inefficient driving habit or function use of the driver, and notifying the monitored situation to the driver.

The small category items for the fuel efficiency performance are classified into idle state negligence, rpm rise in a gear neutral state, lock-up use recommendation, and engine mode down recommendation.

In the score calculation table for the fuel efficiency performance, a determination condition for each small category item and a calculation equation based on the determination condition are defined.

The weight for the small category item of the fuel efficiency performance is applied to the calculation equation of each small category item.

When the idle state negligence item is described, a work standby time of a wheel loader is required due to a work period of an upload target vehicle (truck) or characteristics of a surrounding workplace in the case of an uploading work due to work scheme characteristics of the wheel loader. In this case, in the equipment, an idle state occurs in which the idle state is maintained for a long time without any work activity, and as a result, unnecessary fuel efficiency loss occurs. In this case, the equipment is maintained in the idle state for a long time without any work activity, and as a result, the unnecessary fuel efficiency loss occurs. Accordingly, the idle state negligence item may reduce the fuel efficiency loss when activating an auto idle function or guiding engine stop by monitoring the above-described idle situation.

The determination condition for the item for the idle state negligence is based on auto idle entrance possible condition maintenance time (a time of maintaining FNR neutral & accelerator pedal non-manipulation & main/steering pressure of xx bar), and a calculation equation for the item for the idle state negligence is 100−[Σ(auto idle entrance possible maintenance time of e minutes) ^$Nb_{b1}$}]/total actuation time (minute)×100.

Here, xx may be 30 to 70, e may be 3 to 7, and $N_{b1}$ as a weight for the small category item of the fuel efficiency performance may be 2.

In relation to the rpm rise item in the gear neutral state, in general, the engine rpm rise in the stop state occurs by an engine preheating or postprocessing device motion. However, an excessive engine rpm rise more than necessary gives an adverse effect on the fuel efficiency. The rpm rise item in the gear neutral state is to give a feedback to the driver to avoid unnecessary accelerator pedal use by monitoring such a situation.

The determination condition for the item for the rpm rise in the gear neutral state is based on the number of times of occurrence per unit time (1 hour) for the total actuation time.

A calculation equation for the rpm rise item in the gear neutral state is 100−(rise in accelerator pedal instruction by f % or more (for 1 second or more) in selection gear neutral and front non-manipulation state (forced regeneration, Cal. Reverse rotation condition excluded)×$N_{b2}$).

Here, f may be 40 to 80, and $N_{b2}$ as a weight for the rpm rise item in the gear neutral state may be 1. However, in the case of the forced regeneration, when an accelerator pedal input is entered, the regeneration is cancelled, and as a result, the forced regeneration is excluded.

In relation to the lock-up use recommendation item, the lock-up function is a function to increase driving performance by reducing energy loss by torque converter (T/C) by directly connecting power between the engine and a transmission without passing through the torque converter (T/C) when traveling at a predetermined speed or more. When the corresponding function is not used even though a driving work ratio is high by monitoring the equipment state, fuel efficiency and work performances may be increased by providing an appropriate guidance to the driver.

A calculation equation for the lock-up use recommendation item is defined as 100−[Σ{vehicle speed of g kph or more & lock-up function selection off maintenance time (minute)}]/total actuation time (minute)×100. Here, g is 10 to 20.

In relation to the engine mode down recommendation item, when an engine power mode is used during light-load working, the fuel efficiency is adversely affected by an output higher than an output required for the work. As an efficient engine output, a low output is used during general working, but when the engine output is increased and used limitedly only in a situation in which the high output is required, such as the excavation and slope, fuel consumption may be reduced. The engine mode down recommendation item is to determine whether to use an unnecessary high output mode and give an appropriate guidance to the driver by monitoring an engine output use pattern so as to guide such a use pattern.

A calculation equation for the engine mode down recommendation item is defined as the number of times of a power mode foot switch motion per unit time×$N_{b3}$.

Here, $N_{a3}$ as a weight for the engine mode down recommendation item may be 3.

In FIG. 4, it may be understood that a weight of an item for which the weight is not particularly indicated is set to 1.

FIG. 5 is a diagram illustrating a score calculation table for equipment durability according to an exemplary embodiment of the present disclosure. Referring to FIG. 5, in the score calculation table for the equipment durability, a small category item for evaluating the equipment durability is defined, and a factor calculation equation and a weight of each small category item are defined.

The equipment durability item is a factor that monitors a situation which may cause excessive wear and damage to the equipment due to an inappropriate driving habit or operation of the driver and notifies the monitored situation to the driver to prevent negative use to a durability life of the equipment.

Detailed items for the equipment durability are classified into sudden stop prevention, prevention of braking without braking intention, unnecessary hydraulic relief, and ICCO function use recommendation.

In the score calculation table for the equipment durability, a determination condition for each detailed item and a calculation equation based on the determination condition are defined.

The weight for the small category item of the equipment durability is applied to the calculation equation of each small category item.

In relation to the sudden stop prevention item, sudden stop means a behavior that strains an internal brake disk of an accelerator due to excessive brake use within a short time during traveling. In particular, since the sudden stop may adversely affect equipment stability in a state in which a work object is loaded, the sudden stop is a driving scheme which should be prevented in no urgent situation. As such, the sudden stop prevention item is to transfer an appropriate feedback to the driver when a sudden stop situation frequently occurs by monitoring a use pattern frequency.

The determination condition for the sudden stop prevention item includes the number of times when the vehicle speed is abruptly stopped for a unit time, and such a calculation equation is defined as 100−(the number of times of maintaining vehicle speed of h kph or more & brake pedal pressure of reference bar or more (or brake pedal displacement reference of i % or more) for j seconds or more×$N_{c1}$).

Here, h may be 3 to 7, i may be 70 to 90, j may be 1 to 3, and $N_{c1}$ as a weight for the sudden stop prevention item may be 2.

In relation to the item of the prevention of braking without braking intention, the use of the brake pedal without braking intention may be used as a means for continuing driving while the driver steps a driver's foot on the brake pedal unconsciously or promoting the driving stability in touch areas. However, such a use habit significantly strains accelerator durability. The item of the prevention of braking without braking intention is to transfer the appropriate feedback to the driver by monitoring such a situation.

The determination condition for the item of the prevention of braking without braking intention considers the number of times of continuously maintaining the pedal pressure of 3 to 10 bar for a unit time, and such a calculation equation is 100−(the number of times of continuously maintaining the brake pedal pressure interval of 3 to 10 bar & accelerator pedal input state for k seconds or more×$N_{c2}$).

Here, k may be 3 to 7, and $N_{c2}$ as a weight for the item of the prevention of braking without braking intention may be 3.

The unnecessary hydraulic relief item is to prevent a working scheme that exceeds the maximum permissible pressure of the hydraulic system through an unreasonable manipulation in the work machine and during steering. Long-time relief generation other than relief generated for a short time for output rise is a behavior that may degrade the fuel efficiency and strain the hydraulic system. The unnecessary hydraulic relief item is to transfer the appropriate feedback to the driver by monitoring such a situation.

The determination condition for the unnecessary hydraulic relief item considers the number of times of occurrence of the hydraulic stall for 1 second or more for a unit time, and such a calculation equation is 100−(the number of times of reaching a front relief pressure value without a change in angle sensor value (for 1 second or more)×$N_{c3}$).

Here, $N_{c3}$ as a weight for the unnecessary hydraulic relief item may be 5.

In relation to the ICCO function use recommendation item, a clutch cut off function is a function to send an engine output to the hydraulic system by controlling a pressure of a clutch of a front and rear vibration power system of the transmission according to a brake pedal signal and an output torque value of the transmission. For example, in the excavator, during the excavation work, when clutch cut off is not used, there may be a high possibility that tire slip or accelerator overload will occur. The ICCO function use recommendation item is to guide the driver to use the corresponding function under a work environment in which ICCO use is recommended by monitoring such a situation.

The determination condition for the ICCO function use recommendation item considers the brake pedal pressure for a unit time (e.g., 1 hour) in an ICCO function off state or the number of times of using the accelerator pedal in a displacement sensor input state, and an accelerator pedal use criterion is a case of a forward movement state & a brake pressure of 1 bar or more & 'ON' state of accelerator pedal valid switch & rpm of m or more. Here, 1 may be 10 to 20 and m may be 1100 to 1500.

For reference, the accelerator pedal valid switch as a switch turned on or off by the user is a component for notifying, to the control unit, whether to determine that a signal generated from the accelerator pedal is valid. When the control unit receives a signal change from the accelerator pedal, the control unit checks a valid switch in order to determine whether the input signal is a valid signal. When the control unit does not receive the signal of the valid switch, the control unit determines that the corresponding analog signal is a signal generated by failure or external noise.

Such a calculation equation is defined as 100−(forward movement state & brake pressure of n bar or more & accelerator pedal valid switch 'ON' & rpm of o or more (for 1 second or more)×$N_{c4}$).

Here, n may be 10 to 20, o may be 1100 to 1500, and $N_{c4}$ as a weight for the ICCO function use recommendation item may be 1.

A larger weight for the equipment durability item may be assigned in the order of the unnecessary hydraulic relief, the prevention of braking without braking intention, the sudden stop prevention item, and the ICCO function use recommendation item. For example, a ratio of the weights of the unnecessary hydraulic relief, the prevention of braking without braking intention, the sudden stop prevention item, and the ICCO function use recommendation item may be 5:3:2:1.

Figure 6:
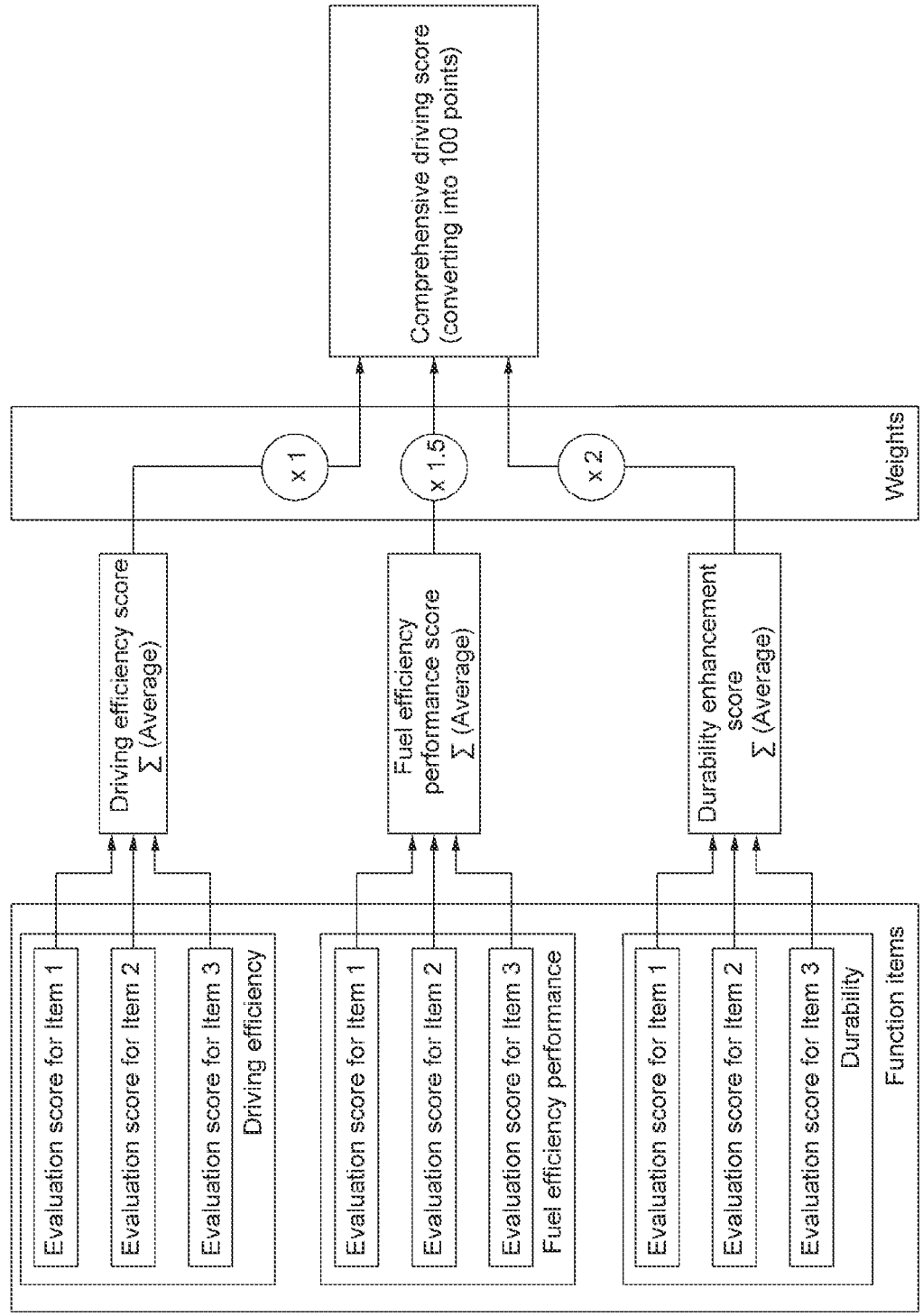
FIG. 6 is a diagram for describing a compressive score calculating method according to an exemplary embodiment of the present disclosure.

FIG. 6 is a diagram for describing a compressive score calculating method according to an exemplary embodiment of the present disclosure.

The evaluation score according to the calculation equation for each small category item included in each large category item is calculated and then respective small category item scores for the large category item are added to obtain an average value of the respective small category items for each large category item. Each calculation equation is based on the number of occurrence times and a maintenance time for the small category item for a unit time while driving the construction equipment.

In an exemplary embodiment of the present disclosure, the large category items are the driving efficiency, the fuel efficiency performance, and the equipment durability.

The small category item for the driving efficiency which is the large category item includes the LIS function use recommendation item, the LIS vehicle speed setting up change recommendation item, the LIS vehicle speed setting change recommendation item, the gear 1-4 auto use recommendation item, and the manual gear maximum speed driving item.

The score for each small category item of the driving efficiency is calculated based on the small category item-specific score calculation table for the driving efficiency illustrated in FIG. 3. Next, an average of the calculated score for each small category item of the driving efficiency is obtained and set as the evaluation score of the driving efficiency.

The small category items for the fuel efficiency performance which is the large category item include the idle state prevention item, the rpm rise item in the gear neutral state, the lock-up use recommendation item, and the engine mode down recommendation item.

The score for each small category item of the fuel efficiency performance is calculated based on the small category item-specific score calculation table for the fuel efficiency performance illustrated in FIG. 4. Next, an average of the calculated score for each small category item of the fuel efficiency performance is obtained and set as the evaluation score of the fuel efficiency performance.

The small category item for the equipment durability which is the large category item includes the sudden stop prevention item, the item of the prevention of braking without braking intention, the unnecessary hydraulic stall item, and the ICCO function use recommendation item.

The score for each small category item of the equipment durability is calculated based on the small category item-specific score calculation table for the equipment durability illustrated in FIG. 5. Next, an average of the calculated score for each small category item of the equipment durability is obtained and set as the evaluation score of the equipment durability.

Next, the comprehensive score is calculated by applying a large category item-specific weight to an average value acquired by averaging the scores of the small category items included in the large category item. That is, preset weights are applied to the evaluation score of the driving efficiency, the evaluation score of the fuel efficiency performance, and the evaluation score of the equipment durability, respectively and then an average thereof is obtained to acquire the comprehensive score.

A majority of the weight may be assigned in the order of the driving efficiency, the fuel efficiency performance, and the equipment durability. For example, the weight may be assigned at the ratio of 1:1.5:2 for the driving, efficiency, the fuel efficiency performance, and the equipment durability.

The comprehensive score may be converted and displayed into 100 points.

Each function item according to an exemplary embodiment of the present disclosure is selected for efficient use of the equipment. However, since the function item, functional efficiency, equipment durability enhancement contribution, and fuel efficiency reduction may be different in an absolute contribution degree in terms of long-term operation and management of the equipment, the comprehensive score is calculated by applying the weight for each item for compensating each contribution degree. That is, by the comprehensive score provided in an exemplary embodiment of the present disclosure, distortion of the comprehensive score may be prevented by considering a contribution degree of the efficient driving between respective function items.

FIG. 7 is a diagram displaying a guide phrase corresponding to a small category item according to an exemplary embodiment of the present disclosure.

As illustrated in FIG. 7, the storage unit stores each guide phrase which matches each small category item (function item).

The guide phrase matching the LIS function use recommendation item may be "recommend LIS use".

The guide phrase matching the LIS vehicle speed setting up change recommendation item may be "recommend LIS setting vehicle speed up".

The guide phrase matching the LIS vehicle speed setting down change recommendation item may be "recommend LIS setting vehicle speed down".

The guide phrase matching the 1-4 auto use recommendation item may be "recommend automatic 1-4 mission mode use".

The guide phrase matching the manual gear maximum speed driving item may be "recommend selection gear up".

The guide phrase matching the idle state prevention item may be "recommend turning off start during idling".

The guide phrase matching the rpm rise item in the gear neutral state may be "recommend decreasing accelerator pedal use in the stop state".

The guide phrase matching the lock-up use recommendation item may be "recommend lock-up use".

The guide phrase matching the engine mode down recommendation item may be "recommend engine mode down".

The guide phrase matching the sudden stop prevention item may be 'recommend decreasing sudden braking".

The guide phrase matching the sudden stop prevention item may be 'recommend decreasing sudden braking".

The guide phrase matching the item of prevention of braking without braking intention may be "recommend decreasing excessive brake pedal use".

The guide phrase matching the unnecessary hydraulic stall item may be "recommend decreasing excessive work machine use".

The guide phrase matching the ICCO function use recommendation item may be "recommend ICCO use".

The control unit selects a random item according to a predefined priority among small category items which are under a preset reference score based on the guide phrase matching each small category item stored in the storage unit, and provides the guide phrase matching the selected item to the display unit. When the priority is the score, the control unit preferentially displays an item having a lower score among items having a score equal to or less than a predetermined reference score with respect to the small category items.

The worker may improve equipment operation efficiency through the guide phrase.

For example, a method (guide phrase) that may select up to two items having a lowest score equal to or less than the reference score among a plurality of small category items (driving efficiency, fuel efficiency performance, and equipment durability) included in the large category item, and improve the selected items is displayed on the display unit.

If there is not item having the reference score or less, no item is displayed, and if the number of items having the reference score or less is 1, only a corresponding item is displayed.

FIG. 8 is a diagram for describing a active control specification corresponding to the small category item according to an exemplary embodiment of the present disclosure.

The active control specification represents an equipment setting value which may be improved with respect to an item selected as a guide display target item as the score of the driver is low among guide items.

As illustrated in FIG. 8, the storage unit stores improvable active control (equipment setting) matching each small category item (function item).

The control unit selects a random item according to a predefined priority among small category items which are under a preset reference score based on the active control (equipment setting) matching each small category item stored in the storage unit, and provides active control (equipment setting) information matching the selected item to the display unit.

More specifically, in a preset control setting state, e.g., initial key-on, a confirmation screen for whether to change the equipment setting to the active control matching the selected item is displayed on the display unit. The screen may be provided in a pop-up form.

The displayed screen will be described below with reference to FIG. 10.

When the worker inputs an approval for setting change, the control unit changes related vehicle setting.

For example, when the control unit receives the setting change approval from the worker with respect to the LIS function use recommendation item, the control unit turns on the LIS function to change the vehicle setting.

When the control unit receives the setting change approval from the worker with respect to the 1-4 auto use recommendation item, the control unit changes to a T/M A1-4 mode to change the vehicle setting.

When the control unit receives the setting change approval from the worker with respect to the idle state prevention item, the control unit turns on the auto idle function and turns on ASD to change the vehicle setting.

When the control unit receives the setting change approval from the worker with respect to the lock-up use recommendation item, the control unit turns on the lock-up function to change the vehicle setting.

When the control unit receives the setting change approval from the worker with respect to the engine mode down recommendation item, the control unit shifts a current engine mode down by one stage to change the vehicle setting.

When the control unit receives the setting change approval from the worker with respect to the ICCO function use recommendation item, the control unit turns on the ICCO function to change the vehicle setting.

Figure 9:
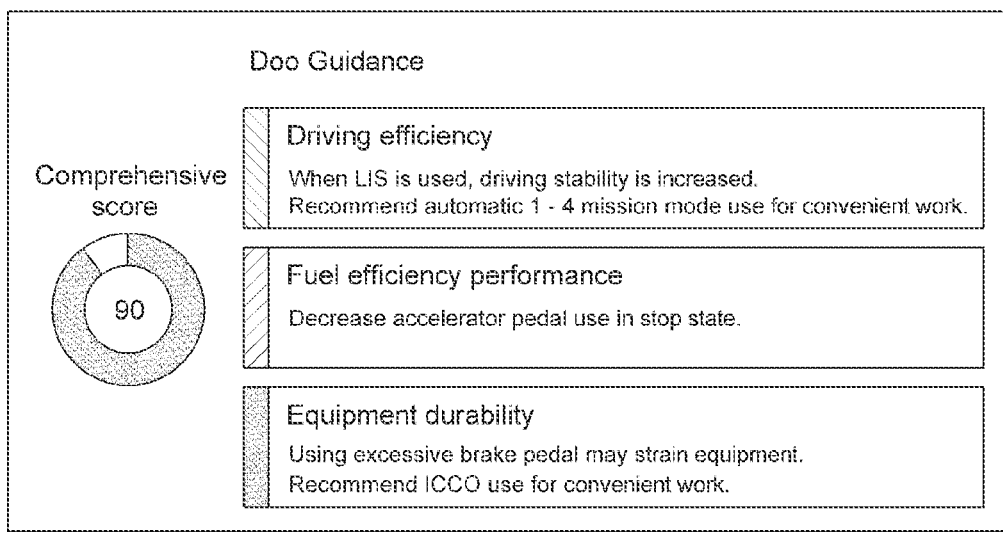
FIG. 9 illustrates an example of an information providing screen displayed in a display unit according to an exemplary embodiment of the present disclosure.

FIG. 9 illustrates an example of an information providing screen displayed in a display unit according to an exemplary embodiment of the present disclosure.

The information providing screen illustrated in FIG. 9 is one example of a screen providing driving information based on data accumulated from a start-on time to a start-off time which is an end time of the construction equipment by the worker according to an exemplary embodiment of the present disclosure.

A display screen may display the comprehensive score, and the guide phrase for the small category item having a score less than the reference score with respect to each of the fuel efficiency, the efficiency, and the durability which are respective large category items.

The reference score is a score which becomes a reference for determining an item to be guided to the driver based on the score calculated according to the calculation equation for each guide item.

Information on each average score for each large category item may be provided.

Each score may be displayed as a number, and as illustrated in FIG. 9, each score may be distinguished and displayed by a color according to a score level.

For example, when each score of the large category item and/or the comprehensive score are equal to or more than a first reference score (e.g., 70 points), it is evaluated that the efficiency level is excellent and the score is displayed with a preset first color (e.g., green). When each score of the large category item and/or the comprehensive score are equal to or more than a second reference score (e.g., 50 points) and less than the first reference point (e.g., 70 points), it is evaluated that the efficiency level is good and the score is displayed with a preset second color (e.g., yellow). When each score of the large category item and/or the comprehensive score are less than the second reference score (e.g., 50 points), it is evaluated that the efficiency level is insufficient and the score is displayed with a preset third color (e.g., orange).

As such, the average score for each large category item is displayed with the color to allow the worker to easily determine an operation level of each item.

Figure 10:
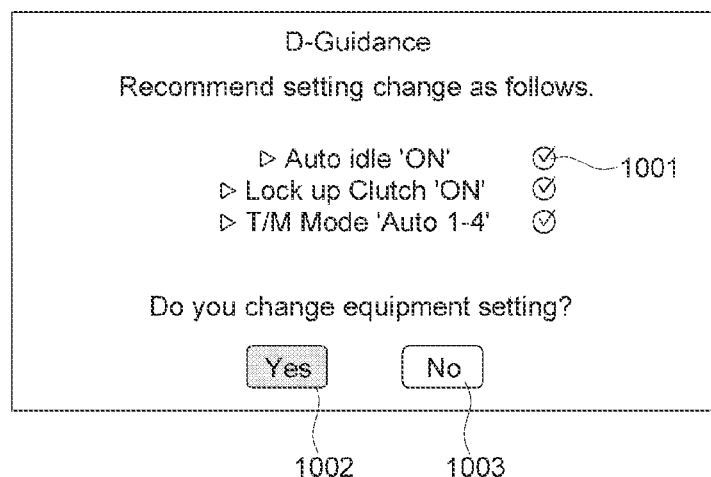
FIG. 10 illustrates one example of a setting screen of the active control according to an exemplary embodiment of the present disclosure.

FIG. 10 illustrates one example of a setting screen of the active control according to an exemplary embodiment of the present disclosure.

The setting screen of the active control according to an exemplary embodiment of the present disclosure as a setting screen of the active control matching an item selected among the small category items having a score under a preset reference score is a screen for notifying active control matters associated with small category items included in a driving guide item to the driver and receiving an approval for a control change of the vehicle.

The setting screen of the active control may be displayed by transferring the active control item according to the previous driving information to the display unit by the control unit at a preset time, e.g., at the time of key-on and/or key-off.

The setting screen of the active control may include information on selected active control, a selection button 1001 for the information, an acceptance button 1002 for permitting the change of the equipment setting, and a cancel button 1003 for not permitting the change of the equipment setting. A user interface displayed as such has a separate selection button 1002 for each item so as to input the approval of the worker for each item in which the equipment setting change is displayed.

The worker checks the displayed active control matters to check only a selection button 1002 corresponding to an item for which active control is desired and selects the acceptance button 1002 to set the active control of the corresponding item.

In another exemplary embodiment, the selection screen may be implemented in such a manner that by selecting all selection buttons by default, a selection button for active setting not desired by the worker is checked to cancel the selection. Such a selection screen may be set to be provided for a preset time, e.g., 10 seconds and automatically disappear.

When the user inputs cranking without any selection after selecting the screen for the active control, the control unit may erase the screen for the active control from the display unit and determine that the worker selects the cancel button 1003.

When the worker does not desire any active control matter, the worker may select the cancel button 1003.

The active control screen is provided as such to allow the worker to easily determine an equipment setting method for increasing equipment efficiency based on the driving habit of the worker and easily apply the corresponding equipment setting.

Further, there is an advantage in that the active control is executed through confirmation from the worker, and as a result, or the active control is not performed for work setting which is contrary to the intention of the worker or an item determined to cause danger.

The term "unit" used in the exemplary embodiment means software and hardware components such as FPGA or ASIC and the "unit" performs predetermined roles. However, the "unit" is not a meaning limited to software or hardware. The "unit" may be configured to reside on an addressable storage medium and may be configured to play back one or more processors. Accordingly, as one example, the "unit" includes components such as software components, object oriented software components, class components, and task components, processes, functions, attributes, procedures, subroutines, segments of a program code, drivers, firmware, microcodes, circuitry, data, databases, data structures, tables, arrays, and variables. Functions provided in the components and the "units" may be combined into a smaller number of components and "units" or further separated into additional components and "units". Moreover, the components and the 'units' may be implemented to reproduce one or more CPUs in a device or a secure multimedia card It will be appreciated that those skilled in the art that the present disclosure belong to the technical field of the technical field may be practiced in other specific forms without changing the technical spirit or essential features. Therefore, it should be appreciated that the aforementioned embodiments are illustrative in all aspects and are not restricted. The scope of the present disclosure is represented by claims to be described below rather than the detailed description, and it is to be interpreted that the meaning and scope of the claims and all the changes or modified forms derived from the equivalents thereof come within the scope of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An apparatus for providing drive guide information of a construction equipment, the apparatus comprising:
    an information acquisition unit acquiring information generated according to a motion of the construction equipment;
    a storage unit storing an item defined for calculating a score for worker driving of the construction equipment and an equation for calculating the score for the item, and storing a guide phrase for each item and information on equipment setting change for each item;
    a control unit calculating the score for each item according to the information provided from the information acquisition unit and the equation, and selecting an item which needs to be improved based on the calculated score for each item; and a display unit displaying a guide phrase matching an item selected according to an instruction of the control unit and information on equipment setting change matching the selected item at a predetermined time, wherein the control unit is capable of changing equipment setting of the selected items the defined item includes a large category item and a small category item, the storage unit further includes a determination condition of each small category item and a calculation equation for each of the small category items, and each calculation equation is based on a number of occurrence times and a maintenance time for the small category item for a unit time while driving the construction equipment.

2. The apparatus of claim 1, further comprising:

an input unit receiving a user approval for the equipment setting change, wherein the control unit changes the equipment setting of the selected item when the user approval is input through the input unit.

3. The apparatus of claim 1, wherein the predetermined time includes at least any one time of a start-on time or a start-off time.

4. The apparatus of claim 1, wherein the large category item is classified into and includes driving efficiency of the construction equipment, fuel efficiency performance, and equipment durability.

5. The apparatus of claim 1, wherein the control unit preferentially selects an item having a lower score among items having a score equal to or less than a predetermined reference score with respect to the small category item.

6. The apparatus of claim 1, wherein the control unit calculates a comprehensive score based on data acquired from the start-on time to the start-off time of the construction equipment.

7. The apparatus of claim 1, wherein the control unit averages the score calculated for each small category item included in the large category item and sets the averaged score as an evaluation score of the large category item, and a weight is applied to the evaluation score of each large category item, which is averaged to calculate the comprehensive score.

8. The apparatus of claim 1, wherein the defined item includes driving efficiency of the construction equipment, fuel efficiency performance, and equipment durability, and the control unit calculates a comprehensive score by applying a weight to an evaluation score of each large category item, and a higher weight is assigned in the order of the driving efficiency, the fuel efficiency performance, and the equipment durability.

9. The apparatus of claim 1, wherein when there is a plurality of items in which the equipment setting change is displayed, the control unit enables an approval of a worker to be inputted for each item.

10. An information providing method of an apparatus for providing drive guide information of a construction equipment, the information providing method comprising:

acquiring information generated according to a motion of the construction equipment;

calculating a score for each item based on a defined item, an equation for calculating the score for the item, and the acquired information;

selecting an item which needs to be improved based on the score for each item;

displaying a guide phrase matching the selected item and information on equipment setting change matching the selected item at a predetermined time; and changing equipment setting of the selected item wherein the defined item includes a large category item and a small category item, and a determination condition of each small category item and a calculation equation for each small category item are prestored, and each calculation equation is based on a number of occurrence times and a maintenance time for the small category item for a unit time while driving the construction equipment.

11. The information providing method of claim 10, further comprising: between the displaying of the information on the equipment setting change at the predetermined time and the changing of the equipment setting of the selected item, providing an interface for receiving a user approval for the equipment setting change.

12. The information providing method of claim 11, wherein the interface enables an approval of a worker to be inputted for each item in which the equipment setting change is displayed.

13. The information providing method of claim 11, wherein the predetermined time includes at least any one time of a start-on time or a start-off time.

14. The information providing method of claim 10, wherein the defined item includes driving efficiency of the construction equipment, fuel efficiency performance, and equipment durability, and the control unit calculates a comprehensive score by applying a weight to an evaluation score of each large category item, and a higher weight is assigned in the order of the driving efficiency, the fuel efficiency performance, and the equipment durability.

* * * * *